(12) United States Patent
Gray

(10) Patent No.: US 6,633,019 B1
(45) Date of Patent: Oct. 14, 2003

(54) METHOD FOR FORMING DESIGN IN A LAYERED PANEL USING A LASER

(75) Inventor: John D. Gray, Union, NH (US)

(73) Assignee: Textron Automotive Company, Inc., Troy, MI (US)

( * ) Notice: Subject to any disclaimer, the term of this patent is extended or adjusted under 35 U.S.C. 154(b) by 0 days.

(21) Appl. No.: 09/890,945

(22) PCT Filed: Feb. 3, 2000

(86) PCT No.: PCT/US00/02863
§ 371 (c)(1),
(2), (4) Date: Nov. 27, 2001

(87) PCT Pub. No.: WO00/46045
PCT Pub. Date: Aug. 10, 2000

Related U.S. Application Data

(60) Provisional application No. 60/118,620, filed on Feb. 4, 1999.

(51) Int. Cl.[7] ............................................. B23K 26/00
(52) U.S. Cl. .......................... 219/121.71; 219/121.69; 219/121.72
(58) Field of Search .......................... 219/121.71, 121.7, 219/121.67, 121.68, 121.69, 121.72, 121.85

(56) References Cited

U.S. PATENT DOCUMENTS

| | | | | |
|---|---|---|---|---|
| 4,861,407 A | * | 8/1989 | Volkmann et al. | 156/272.8 |
| 4,968,383 A | * | 11/1990 | Volkmann et al. | 156/643 |
| 5,082,310 A | * | 1/1992 | Bauer | 280/732 |
| 5,968,381 A | * | 10/1999 | Nusshor | 219/121.69 |
| 6,079,733 A | * | 6/2000 | Towler | 280/728.3 |
| 6,210,614 B1 | * | 4/2001 | Gardner, Jr. et al. | 264/46.5 |

FOREIGN PATENT DOCUMENTS

| | | | | |
|---|---|---|---|---|
| DE | 4419197 | | 6/1994 | B05D/3/00 |
| EP | 0711627 | | 5/1996 | B23K/26/00 |
| EP | 711627 A2 | * | 5/1996 | B23K/26/00 |
| FR | 2575114 | | 6/1986 | B44C/1/22 |
| JP | 63-205291 | | 8/1988 | B41M/5/26 |

* cited by examiner

Primary Examiner—M. Alexandra Elve
(74) Attorney, Agent, or Firm—Grossman, Tucker, Perreault & Pfleger, PLLC

(57) ABSTRACT

A method for forming a design in a panel includes providing an outer panel layer on an inner panel layer to form a single composite panel including two layers. The design is then formed into the panel by forming voids in the outer layer. The voids are formed by exposing predetermined regions of the outer layer to a laser beam that burns, vaporizes or otherwise removes portions of the outer layer in each exposed region. The voids create the design by exposing the inner panel layer.

12 Claims, 4 Drawing Sheets

METHOD FOR FORMING DESIGN IN A LAYERED PANEL USING A LASER

This application claims priority of U.S. provisional patent application Ser. No. 60/118,620 filed Feb. 4, 1999.

TECHNICAL FIELD OF THE INVENTION

This invention relates generally to a method for forming a multi-colored or two-toned decorative outer class A surface or first surface on a skin or panel.

INVENTION BACKGROUND

Currently, multicolored or two-tone decorative surfaces are produced on skins or panels by a number of different processes. In general, these processes can be categorized as either coating methods such as painting; or infusion methods such as material pigmenting, i.e., mixing color into plastics materials before the materials are formed into skins or panels.

Processes that employ infusion include slush mold processes where pre-pigmented dry particulate plastic materials are cast against a heated slush mold surface. The cast materials melt on the heated surface to form a shell or skin. Various methods for producing multi-colored or two-tone decorative surfaces includes the use of one or more gaskets in the slush molding process. According to one method, one or more gaskets are used to form a decorative surface on a plastic skin or panel comprising at least two distinct separate areas of plastic material. The gasket is pressed against a heated slush mold surface to separate castings of different-colored charges of dry, particulate plastics material.

Another method for producing multi-colored or two-tone decorative surfaces on skins or panels using pre-pigmented plastic materials includes the masking of certain areas on a heatable slush mold surface. According to this method, a first or "outer" layer is formed by casting a first plastics material against a portion of the heated mold surface. The masking is then removed and a second or "inner" layer is formed by casting a second plastic material of a different color or shade against the outer layer and also onto the exposed areas of the heated mold surface that had been masked during the first casting step.

Each of the above slush mold methods produces a plastic skin or panel having a composite two-tone outer surface. Because the two plastic materials forming the composite surface are cast against the same heated mold surface they form respective outer surfaces that lie flush in relation to each other. In other words, the composite surface is a single-level, smooth surface.

It is also known, in certain automotive applications, for skins, such as seat upholstery, to include textured surfaces comprising a plurality of small diameter cylindrical depressions or through-holes. The depressions or holes formed in these skins are on the order of one millimeter in diameter and are closely spaced in a regular pattern across an entire outer exposed surfaces of such skins.

What is needed is a quick and accurate method for mass producing skins or panels having multi-colored or two-tone designs on an outer surface of each skin or panel.

SUMMARY OF THE INVENTION

According to the invention, a method is provided for forming a design in a panel (12). The method includes providing an outer layer (16), an inner layer (18) and providing the outer layer (16) on the inner layer (18) in a layered disposition. The method further includes providing a design (14) in the panel (12) by forming voids (17) in the outer layer (16) that expose the inner layer (18).

The voids (17) are provided in the outer layer (16) by exposing predetermined regions of the outer layer (16) to a laser beam (32) capable of burning, evaporating or otherwise removing portions of the outer layer (16) in each exposed region. The employment of laser technology allows detailed designs to be created in the outer class A surfaces of large numbers of like panels both quickly and accurately in an assembly line process.

BRIEF DRAWING DESCRIPTION

To better understand and appreciate the invention, refer to the following detailed description in connection with the accompanying drawings.

PREFERRED EMBODIMENT DESCRIPTION

Figure 1:
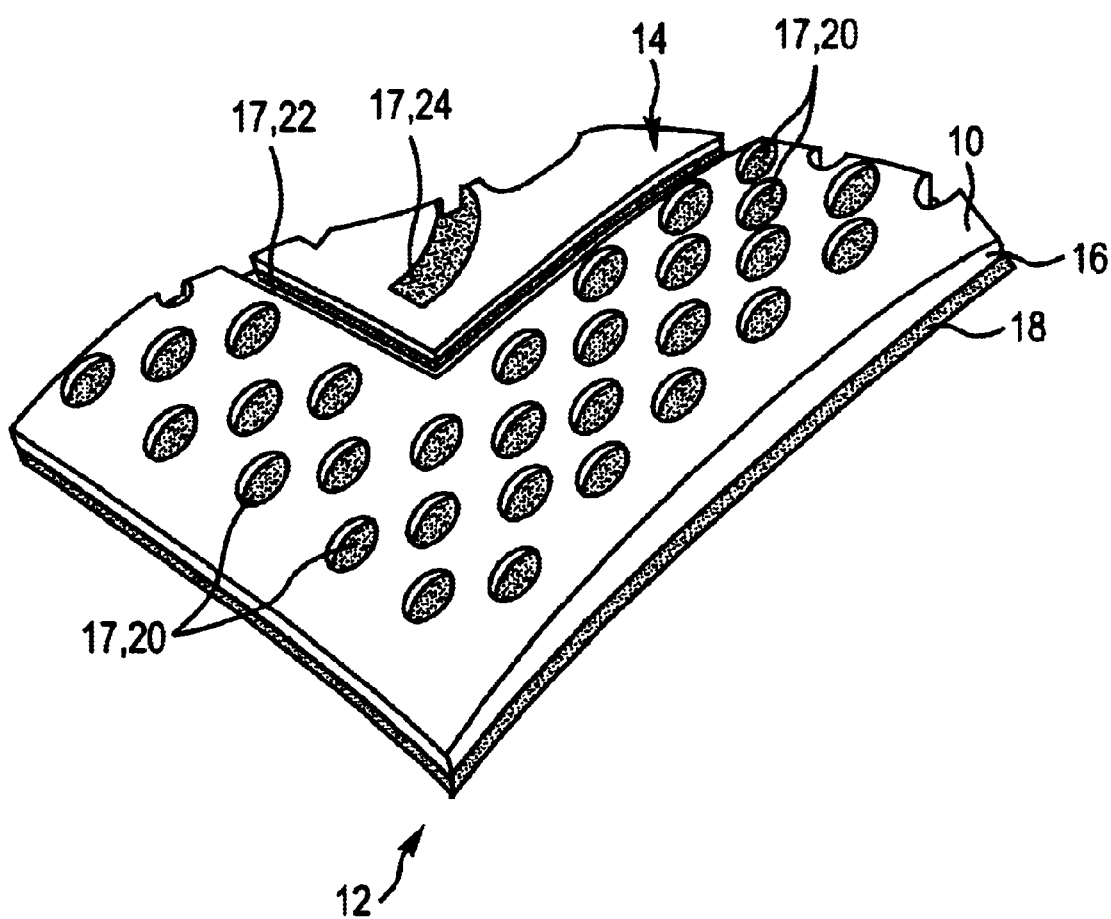
FIG. 1 is a perspective view of a plastic panel having a design formed according to the inventive method.
Figure 2:
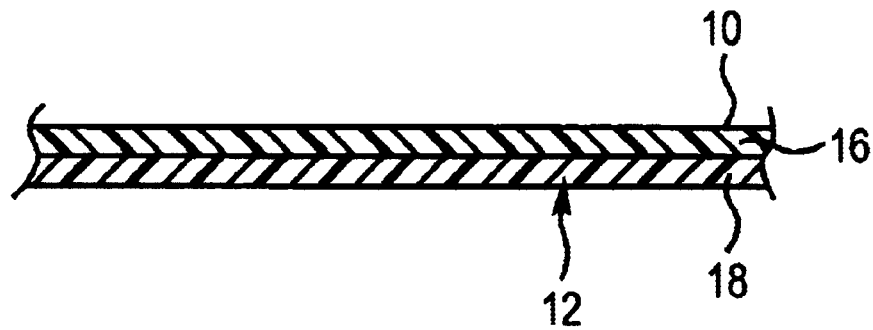
FIG. 2 is a partial cross-sectional edge view of the plastic skin of FIG. 1 before design formation.
Figure 3:
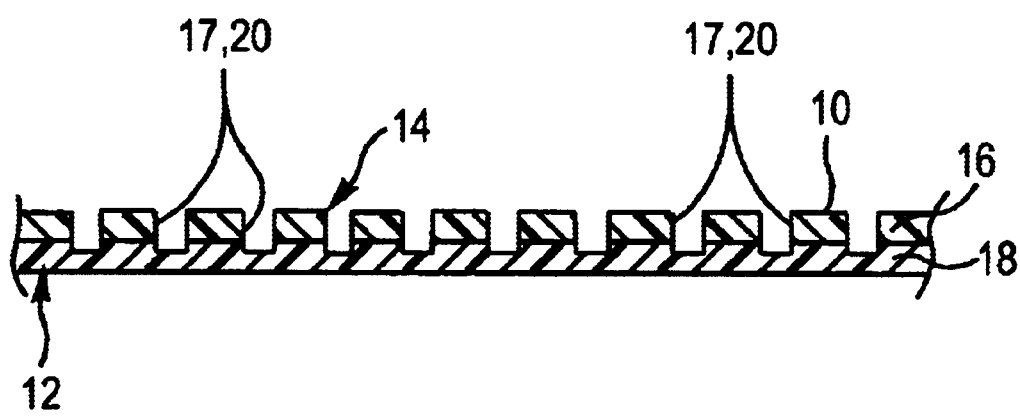
FIG. 3 is a partial cross-sectional edge view of the plastic skin of FIG. 1.

A two-tone design formed on and into an outer surface 10 of a plastic skin or panel 12 according to the inventive method is generally indicated at 14 in FIGS. 1 and 3. According to the method, the skin or panel 12 is first manufactured without a design as shown in FIG. 2. The skin or panel 12 is manufactured to include at least two layers as shown at 16 and 18 in FIGS. 1–3. The two layers may completely overlap through the skin or panel, or may partially overlap in an area where the design is to be applied according to the invention. The two layers 16, 18 comprise respective first and second materials of different appearance, preferably plastic materials. The difference in appearance between the respective first and second plastic materials may be due to differences in any one of a number of different visually discernable attributes including but not limited to color, intensity, texture, pattern, gloss, and thickness.

As used herein, a difference in appearance may be visually discernable via ordinary viewing with the naked eye or where more objectivity is desired, discernable via a difference in numeric values as measured by any industry accepted appearance measurement test. For color, difference is preferably measured as the difference in any individual numerical reading obtained from a spectrophotometer using the CE 1976 L* a* b* scales. For texture, which includes attributes such as grain, orange peel, and surface roughness, a profilometer is preferred to obtain numerical differences. For gloss, a gloss meter is preferred to measure differences in degree of reflective light.

The skin component may be formed from one or more plastics materials including but not limited to polyvinyl chlorides (PVC), thermoplastic urethanes (TPU), thermoplastic olefins (TPO), thermoset urethanes, polyesters, rubbers, polypropylenes, and polyethylenes. The layers 16, 18 may be formed by any known method including but not limited to casting, vacuum forming, blow molding, injection molding, rotational molding, and spray coating. The layers 16, 18 may each be formed separately and then bonded together, or may be manufactured as a single composition including two or more layers 16, 18. In the embodiment of FIGS. 1–3 the outer layer 16 is of a light colored plastics material and has a thickness of approximately 0.010", but may be as little as 0.001" as in the case of a spray coating. The second or underlying layer 18 shown in FIGS. 1–3 is of a darker colored plastics material and has a thickness of approximately 0.040". As shown in FIGS. 1 and 3, the areas where portions of the first or outer layer 16 have been removed leave exposed the underlying, darker second layer 18. While plastic materials are preferred, other materials which could be substituted in any combination and in any relative position including but not limited to textiles, leather, metals, wood, and natural and synthetic resins.

Figure 4:
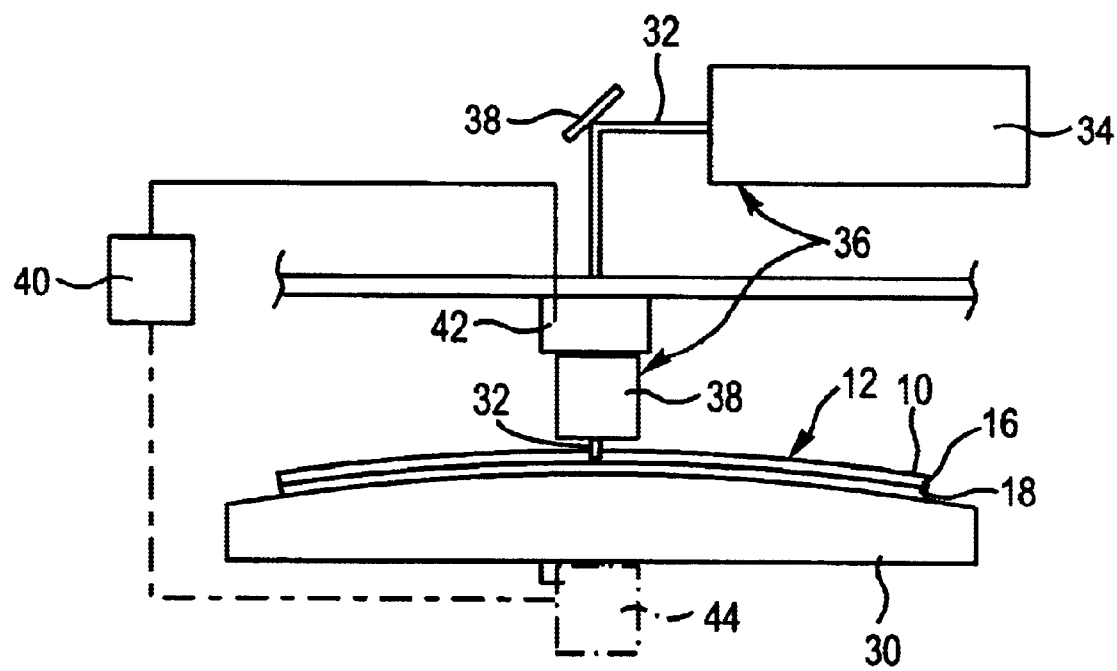
FIG. 4 is a schematic front view of the panel of FIG. 1 supported on a holding fixture and being lased by a laser beam from a laser gun, a laser controller and a laser drive mechanism constructed according to the invention, an alternate holding fixture drive mechanism being shown in phantom.

After formation, the skin or panel 12 is transported from a manufacturing area to a laser station shown schematically in FIG. 4. At the laser station the skin or panel 12 is placed on a holding fixture 30 and the outer surface 10 of a first 16 or "outer" one of the two layers 16, 18 is exposed to a laser beam 32 produced by a laser beam generator 34 of a laser gun 36 and delivered by a beam delivery mechanism 38 of the gun 36. The laser gun 36 may be connected to an electronic controller 40 programmed to provide and remove the laser beam 32 by either energizing and deenergizing the beam generator 34 or by directing and redirecting or blocking and unblocking the laser beam 32 generated by the beam generator 34. The controller 40 may also be programmed to command a laser gun drive mechanism 42 to move the laser beam 32 to various predetermined points on the panel 12 or to direct the laser beam 32 toward some point away from the panel. The electronic controller 40 may be programmed to move the laser beam 32 in accordance with a predetermined program to a predetermined series of positions adjacent portions of the outer surface 10 of the first or outer layer 16 of the skin or panel 12 that are to be removed to expose corresponding portions of a second 18 or underlying one of the two layers 16, 18 in a predetermined pattern to form a desired pattern. In each position of the predetermined series of positions the controller 40 then commands the laser gun 36 to operate in such a way as to cause an emitted laser beam 32 to burn away, evaporate or otherwise remove portions of the first layer 16 of the panel 12 to leave corresponding voids 17 that expose corresponding portions of the second layer 18 beneath. As shown in FIGS. 1 and 3, the laser beam 32 may also be caused to burn a short distance into the second layer 18 to insure that the second material is exposed despite any variations in thickness in the first layer 16.

As shown in phantom in FIG. 4, a holding fixture drive 44 may be operatively connected to the holding fixture 30 and/or the panel 12 in place of the laser gun drive 42. In such embodiments the controller 40 is connected to the fixture drive 44 and programmed to move the panel 12 in accordance with a predetermined program to a predetermined series of positions holding portions of the outer surface 10 in the path of the laser beam 32 to form the desired pattern.

The removed portions and resulting voids 17 may, be of any configuration, size and number to create a desired decorative effect. The configuration of the voids 17 may include holes of various shapes, as shown at 20 in FIGS. 1 and 3; lines as shown at 22, FIG. 1; and/or logos, or logo enhancements as shown at 24 in FIG. 1. In addition, a number of voids 17 may be arranged to form a composite logo image or other design 14. The various configurations of voids 17 could, for example, be formed on automotive seat covers or interior trim panels. In other embodiments the voids 17 may be configured to provide decoration and/or first surface weakening of a supplemental inflatable restraint (SIR) door opening.

The skin or panel described above is preferably of a type used for a vehicle trim panel. However, other uses include, but are not limited to toys, construction, furniture, luggage, or any other application where such an aesthetic appearance or function is desirable.

As set forth in the claims, the method includes providing an outer panel layer 16 comprising a first plastic material and an inner panel layer 18 comprising a second plastic material that is different in appearance than the first material. The difference in appearance between the first and second materials may be due to differences in any one of a number of different visually discernable attributes such as color, intensity, texture pattern, gloss, and thickness. The inner and outer panel layer 16s may be the inner and outer panels 12 of an automotive seat cover or of an interior automotive trim panel 12.

Figure 5:
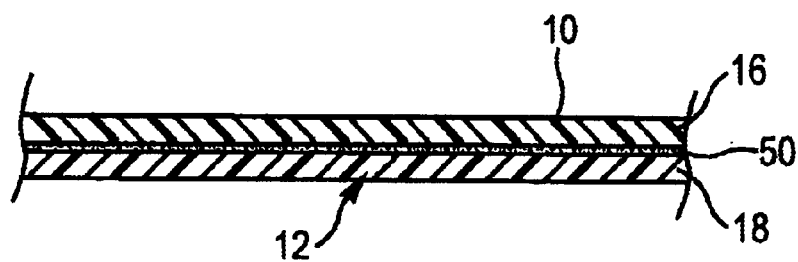
FIG. 5 is a partial cross-sectional edge view of the plastic skin of FIG. 1 with outer and inner layers bonded together by an adhesive.

As shown in FIG. 5, in providing the outer layer 16 on the inner layer 18 in a layered disposition, an adhesive 50 may first be provided between the outer and inner layers 18. Alternatively, the outer and inner layers 18 may be formed by casting the first and second materials, in powder or particulate form, against a heated mold surface in a slush molding process.

Figure 6:
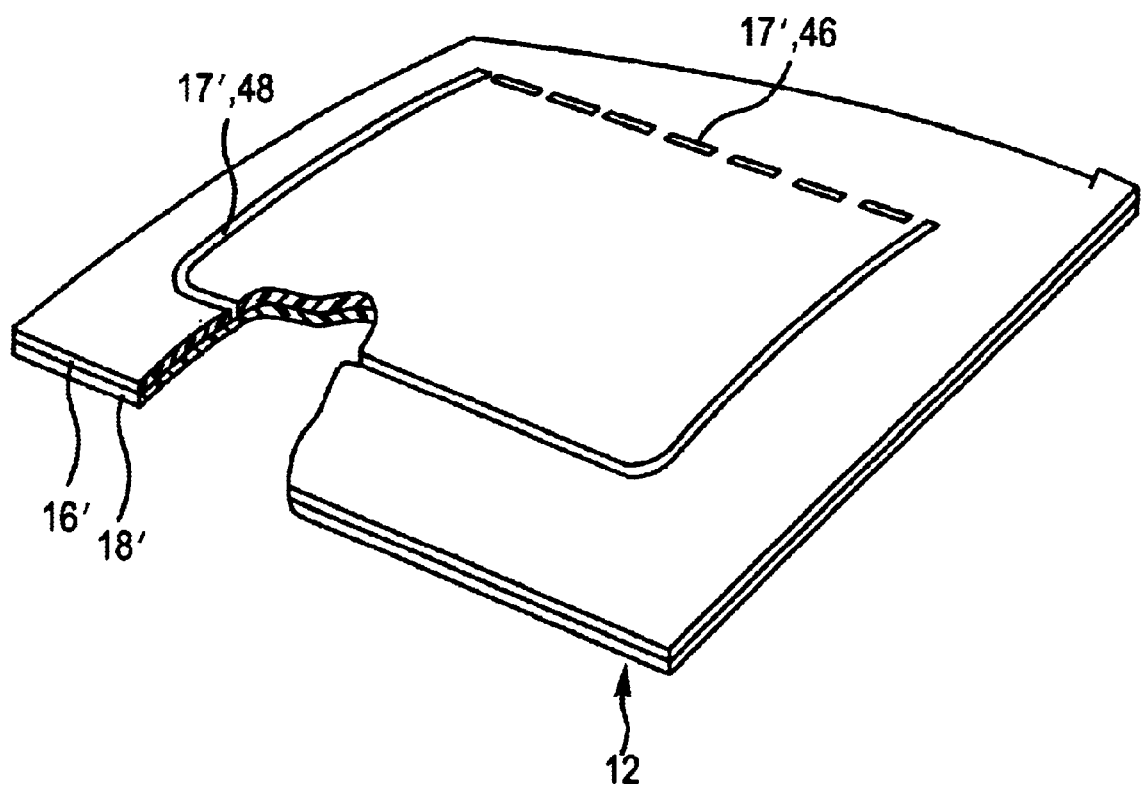
FIG. 6 is a perspective view of a panel having a tear seam formed according to the inventive method to aid in the deployment of an air bag from behind the panel.

A design 14 is provided in the panel 12 by forming voids 17 in the outer layer 16 such that that the inner layer 18 is exposed and visible through the voids 17. The voids 17 may be formed to create a desired decorative effect by, for example, configuring the voids 17 to include holes of various shapes such as linear shapes 22, logos or logo enhancements 24, composite logo images and/or designs 14 formed by providing a number of voids 17 adjacent one another in a predetermined pattern. As shown in FIG. 6, other embodiments may include a weakened region as shown at 46 comprising a plurality of voids 17' provided in a pattern 46 or a weakened region as shown at 48 comprising a single elongated void 17'. Each of these weakened regions 46, 48 are formed in an outer layer 16' of a multi-layer panel 12' and define a supplemental inflatable restraint door opening.

The voids 17 are provided by exposing predetermined regions of the outer layer 16 to a laser beam 32 capable of burning, evaporating or otherwise removing portions of the outer layer 16 in each exposed region. A desired remaining thickness of the second material may be provided beneath each void by causing the laser to burn through the outer layer 16 and, controllably, a desired fixed depth into the inner layer 18.

The laser beam 32 is directed by connecting a controller 40 to a drive mechanism 42 that is operatively connected to either the panel 12 or a laser beam delivery mechanism 38. The controller 40 is programmed to create a predetermined design 14 by commanding the drive mechanism 42 to move one of the panel 12 and the laser beam 32 in a predetermined pattern relative to one another. The controller 40 is also programmed to turn off or redirect the laser when the laser beam 32 has cut to a predetermined depth in to the panel 12.

I intend this description to illustrate certain embodiments of the invention rather than to limit the invention. Therefore I have used descriptive words rather than limiting words.

Obviously, it's possible to modify this invention from what the description teaches. One may practice the invention other than as described.

What is claimed is:

1. A method for forming a design in a panel the method including steps of:

providing a panel outer layer;

providing a panel inner layer;

providing the outer layer on the inner layer in a layered disposition;

providing a design in said outer layer by removing portions of the outer layer thereby resulting voids exposing the inner layer providing the voids by exposing predetermined regions of the outer layer to a laser beam capable of burning, evaporating or otherwise removing portions of the outer layer in each exposed region.

2. The method of claim 1 in which:

the step of providing an outer layer (16) includes providing a layer comprising a first material; and the step of providing the inner layer (18) includes providing a layer that comprises a second material different in appearance from the first material.

3. The method of claim 1 in which:

the step of providing an outer layer (16) includes providing an outer skin (16) for an automotive seat cover (12); and the step of providing an inner layer (18) includes providing an inner layer (18) of an automotive seat cover (12).

4. The method of claim 1 in which:

the step of providing an outer layer (16) includes providing an outer skin (16) for an automotive interior trim panel (12); and the step of providing an inner layer (18) includes providing an inner layer (18) of an automotive interior trim panel (12).

5. The method of claim 1 including the additional step of providing an adhesive between the outer and inner layers before the step of providing the outer layer on the inner layer, wherein the step of removing portions of the outer layer further includes removing corresponding portions of the adhesive.

6. The method of claim 1 in which the step of providing the outer layer (16) on the inner layer (18) and the steps of providing the outer and inner layers (16, 18) include casting the first and second materials against a heated mold surface.

7. The method of claim 1 in which the step of providing a design includes removing portions of the outer layer in a predetermined pattern to create a desired decorative effect.

8. The method of claim 1 in which the step of providing a design includes removing portions of the outer layer to include holes of various shapes.

9. The method of claim 1 in which the step of providing a design removing portions of the outer layer in a pattern forming a weakened region in the outer layer defining a supplemental inflatable restraint door opening.

10. The method of claim 1 in which the step of removing material of the outer layer includes providing a desired remaining thickness of the second material beneath each void by causing the laser beam to burn through the outer layer and a desired depth into the inner layer.

11. The method of claim 1 in which the step of removing material of the outer layer includes directing the laser beam by connecting a controller to a drive mechanism that is operatively connected to one of the panel and a laser beam delivery mechanism of a laser gun, the controller being programmed to create a predetermined design by commanding the drive mechanism to move one of the panel and the laser beam in a predetermined pattern relative to one another.

12. The method of claim 11 in which the step of removing material of the outer layer includes connecting a controller to the laser gun, the controller being programmed to turn off or redirect the laser beam once the laser beam has cut to a predetermined depth into the panel.

* * * * *